(12) United States Patent
Kong et al.

(10) Patent No.: US 7,842,109 B2
(45) Date of Patent: Nov. 30, 2010

(54) REFORMER FOR FUEL CELL SYSTEM HAVING INCREASED HEAT TRANSFER EFFICIENCY

(75) Inventors: Sang-Jun Kong, Suwon-si (KR); Zin Park, Yongin-si (KR); Dong-Uk Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 776 days.

(21) Appl. No.: 11/408,546

(22) Filed: Apr. 21, 2006

(65) Prior Publication Data
US 2006/0239875 A1 Oct. 26, 2006

(30) Foreign Application Priority Data
Apr. 22, 2005 (KR) .................. 10-2005-0033460

(51) Int. Cl.
*B01J 19/00* (2006.01)
*H01M 8/06* (2006.01)
(52) U.S. Cl. .............. 48/89; 48/61; 48/119; 422/149; 422/198; 429/26
(58) Field of Classification Search .......... 429/19–46
See application file for complete search history.

(56) References Cited

U.S. PATENT DOCUMENTS

| | | | |
|---|---|---|---|
| 2,518,583 A | 8/1950 | Watson | |
| 5,639,431 A * | 6/1997 | Shirasaki et al. | 422/212 |
| 2003/0159354 A1 * | 8/2003 | Edlund et al. | 48/127.9 |
| 2004/0197246 A1 * | 10/2004 | Stevens et al. | 422/201 |

FOREIGN PATENT DOCUMENTS

| | | |
|---|---|---|
| EP | 0 615 949 A2 | 9/1994 |
| EP | 0 615 949 A3 | 9/1994 |
| EP | 0 967 005 A2 | 12/1999 |
| EP | 0 967 005 A3 | 12/1999 |
| FR | 1.417.757 | 11/1965 |
| JP | 4-160002 | 6/1992 |
| JP | 06-263402 | 9/1994 |
| JP | 06-263403 | 9/1994 |

(Continued)

OTHER PUBLICATIONS

Patent Abstracts of Japan, Publication No. 04-160002, dated Jun. 3, 1992, in the name of Nobutaka Tsuchimoto et al.

(Continued)

*Primary Examiner*—Ula C Ruddock
*Assistant Examiner*—Imran Akram
(74) *Attorney, Agent, or Firm*—Christie, Parker & Hale, LLP (57) ABSTRACT

A reformer includes a first body, a second body which is disposed in an inner portion of the first body, a heat source unit which is disposed in an inner portion of the second body to generate heat, a reforming reaction unit which includes a reforming catalyst placed in a space between first and second bodies to generate a hydrogen-rich gas from the fuel through a reforming reaction using the reforming catalyst, and a nozzle member which is disposed in the second body to distribute the fuel and the oxygen to the heat source unit.

20 Claims, 6 Drawing Sheets

FOREIGN PATENT DOCUMENTS

| | | |
|---|---|---|
| JP | 06-263405 | 9/1994 |
| JP | 07-109105 | 4/1995 |
| JP | 07-109106 | 4/1995 |
| JP | 2002-104806 | 4/2002 |
| KR | 1996-0034070 | 10/1996 |

OTHER PUBLICATIONS

Korean Patent Abstracts, Korean Patent Laid-Open No. 1019960034070, dated Oct. 22, 1996, in the name of Jae Seong Han et al.

Lahne, U., et al., *Packed bed reactor with wound cooling tubes, a constructive development for execution of exothermic catalytic processes,* Chem-Ing-Tech., vol. 58, No. 3, 1986, pp. 212-215, with English translation.

European Search Report dated Jul. 28, 2006 for EP 06112916.9, in the name of Samsung SDI Co., Ltd.

Japanese Office action dated Mar. 16, 2010, for corresponding Japanese application 2006-116825, noting listed references in this IDS.

* cited by examiner

REFORMER FOR FUEL CELL SYSTEM HAVING INCREASED HEAT TRANSFER EFFICIENCY

CROSS-REFERENCE TO RELATED APPLICATION

This application claims priority to and the benefit of Korean Patent Application No. 10-2005-0033460, filed in the Korean Intellectual Property Office on Apr. 22, 2005, the entire content of which is incorporated herein by reference.

BACKGROUND OF THE INVENTION

1. Field of the Invention

The present invention relates to a fuel cell system, and more particularly, to a reformer for a fuel cell system.

2. Description of the Related Art

A fuel cell system is an electricity generating system that directly converts chemical reaction energy of separately supplied oxygen and hydrogen contained in a hydrocarbon material (e.g., methanol, ethanol, natural gas, etc.) into electrical energy.

A polymer electrolyte membrane fuel cell (PEMFC) is a type of fuel cell that has an excellent output characteristic, a low operating temperature, and fast starting and response characteristics.

In addition, the PEMFC has a wide range of applications including as mobile power sources for vehicles, distributed power sources for homes or other buildings, and small-size power sources for electronic apparatuses.

A fuel cell system employing the PEMFC includes a stack, a reformer, a fuel tank, and a fuel pump.

The stack constitutes a body of the fuel cell for generating electric energy through a reaction of hydrogen and oxygen, and the fuel pump supplies the fuel of the fuel tank to the reformer. The reformer reforms the fuel to generate hydrogen (or hydrogen-rich gas) and supplies the hydrogen to the stack.

The reformer generates the hydrogen from the fuel through a chemical catalytic reaction using thermal energy. That is, the reformer includes a heat source unit for generating the thermal energy and a reforming reaction unit for generating the hydrogen from the fuel through a reforming reaction using the thermal energy.

The heat source unit generates the thermal energy through an oxidation reaction of the fuel and oxygen using an oxidation catalyst.

In a conventional reformer, the heat source unit and the reforming reaction unit are separately distributed, and heat generated by the heat source unit is transferred to the reforming reaction unit. Therefore, heat is not directly exchanged between the heat source unit and the reforming reaction unit, so that the conventional reformer has a low heat transfer efficiency.

In addition, since the heat source unit and the reforming reaction unit are separately distributed, it is difficult to implement a compact fuel cell system.

Further, in the conventional reformer, the fuel and oxygen supplied to the heat source unit are non-uniformly (or locally) distributed over the entire oxidation catalyst of the heat source unit, so that the oxidation reaction occurs non-uniformly. Therefore, in the heat source unit, a temperature gradient occurs. The temperature gradient of the heat source unit further deteriorates the performance and thermal efficiency of the reformer.

SUMMARY OF THE INVENTION

An aspect of the present invention provides a reformer for a fuel cell system capable of increasing (or maximizing) heat transfer efficiency of a heat source unit for providing thermal energy to a reforming reaction unit and of reducing (or minimizing) a volume of the fuel cell system.

According to an embodiment of the present invention, a reformer for a fuel cell system is provided. The reformer includes: a first body; a second body disposed in an inner portion of the first body; a heat source unit disposed in an inner portion of the second body to generate heat; a reforming reaction unit including a reforming catalyst provided in a space between the first and second bodies to generate a hydrogen-rich gas from a fuel through a reforming reaction using the reforming catalyst; and a nozzle member disposed in the second body to distribute the fuel and an oxidant to the heat source unit.

In one embodiment, the reformer further includes a path member connected to the second body and disposed in the inner portion of the first body to vent a combustion gas generated by the second body from the first body.

In one embodiment, the nozzle member has a shape of a pipe having an opened end and a closed end and is provided with a nozzle pattern for distributing the fuel and the oxidant in the inner portion of the second body.

In one embodiment, the closed end of the nozzle member is disposed in the inner portion of the second portion.

In one embodiment, the nozzle pattern is constructed with a plurality of nozzle holes.

In one embodiment, the nozzle holes are formed to have different sizes.

In one embodiment, the nozzle holes are disposed with different intervals according to regions of the nozzle member.

In one embodiment, the path member has a shape of a coil.

In one embodiment, the second body has a first end and a second end, both the first end and the second end being substantially closed, the first end being provided with a first hole through which the nozzle member is inserted into the inner portion of the second body, and the second end being provided with a second hole through which the combustion gas is vented.

In one embodiment, the path member is connected to the second hole.

In one embodiment, the first body has a third end and a fourth end, both the third end and the fourth end being substantially closed, the third end being provided with a third hole through which the fuel is injected, and the fourth end being provided with a fourth hole through which the hydrogen-rich gas is vented.

In one embodiment, the third end of the first body is provided with a fifth hole through which the path member is extracted.

In one embodiment, the reforming catalyst is formed to have a pellet shape.

In one embodiment, the heat source unit includes an oxidation catalyst placed in the inner portion of the second body.

In one embodiment, the oxidation catalyst is formed to have a pellet shape.

According to another embodiment of the present invention, a reformer for a fuel cell system is provided. The reformer includes: a thermal insulating outer body; a heat source unit disposed in an inner portion of the thermal insulating outer body to generate heat; a reforming reaction unit provided in a space between the heat source unit and the thermal insulating outer body to generate a hydrogen-rich gas from a fuel through a reforming reaction, the reforming reaction unit surrounding the heat source unit; and a nozzle member disposed with a nozzle pattern in the heat source unit to uniformly distribute the fuel and an oxidant to the heat source unit.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

Figure 1:
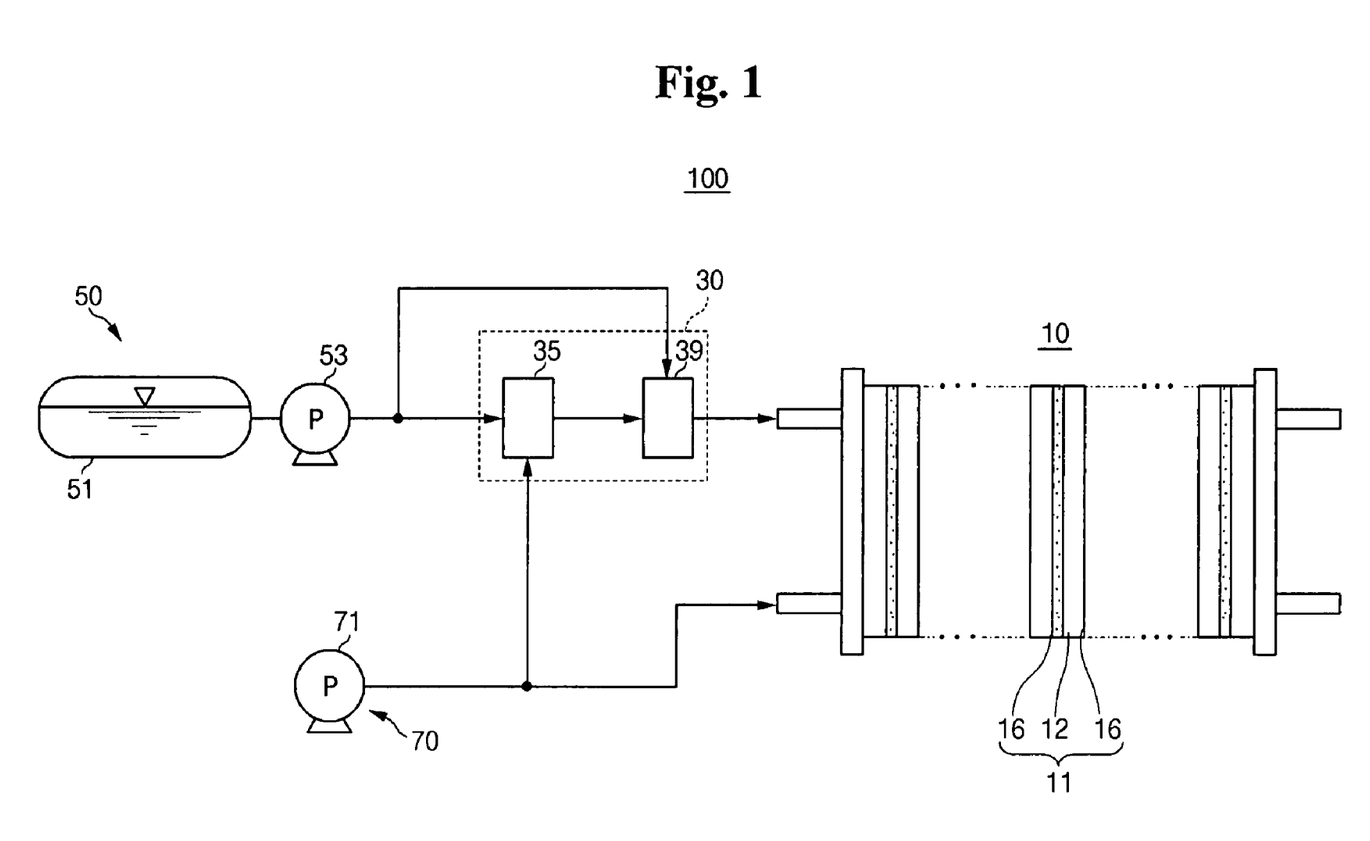
FIG. 1 is a schematic block diagram showing a fuel cell system according to an embodiment of the present invention.

FIG. 1 is a schematic block diagram showing a construction of a fuel cell system employing a reformer according to an embodiment of the present invention.

Referring to FIG. 1, a fuel cell system 100 employs a polymer electrolyte membrane fuel cell (PEMFC) which generates hydrogen (or hydrogen-rich gas) by reforming a fuel and generates electric energy through an electro-chemical reaction of the hydrogen and oxidant.

In the fuel cell system 100, the fuel includes a liquid or gaseous fuel containing hydrogen such as methanol, ethanol, natural gas, etc. In the following description, the fuel cell system 100 using a liquid fuel such as methanol is exemplified.

In the fuel cell system 100, the oxidant (or oxidant gas) reacting with the hydrogen may be oxygen separately stored in a storage unit or air containing oxygen. Hereinafter, the latter is exemplified.

The fuel cell system 100 includes electricity generators 11 which generate electric energy through a reaction of hydrogen and oxygen, a reformer 30 which generates hydrogen (or hydrogen-rich gas) from a fuel through a catalytic reaction using thermal energy and supplies the hydrogen to the electricity generators 11, a fuel supply unit 50 which supplies the fuel to the reformer 30, and an air supply unit 70 which supplies air (containing oxygen) to the reformer 30 and the electricity generators 11.

Each of the electricity generators 11 is a unit fuel cell that includes a membrane electrode assembly (MEA) 12 and separators (bipolar plate) 16 respectively disposed on opposite surfaces of the membrane electrode assembly 12.

Figure 2:
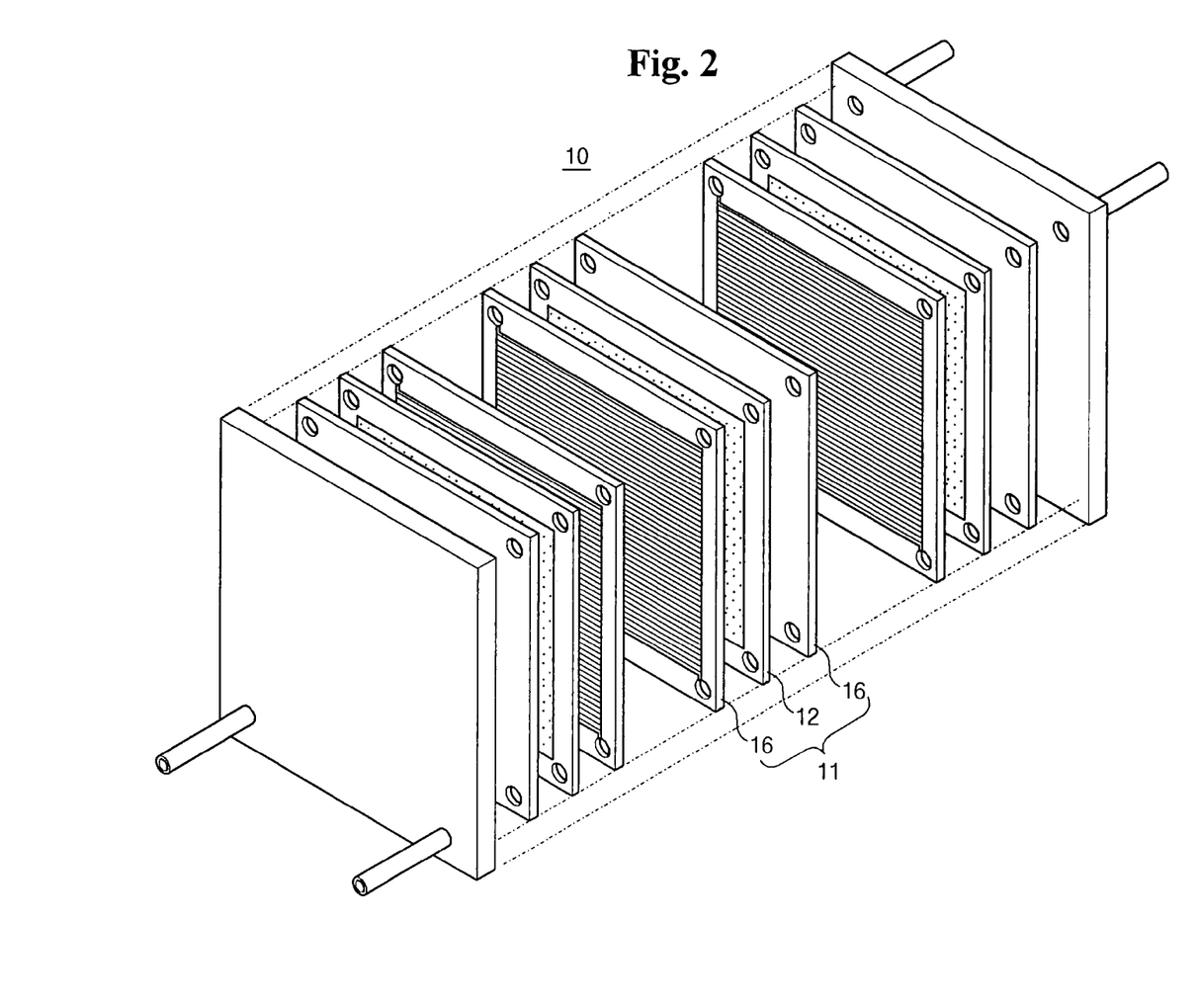
FIG. 2 is an exploded perspective view showing a stack shown in FIG. 1.

In the embodiment, as shown in FIG. 2, the stack 10 is an assembly of the electricity generators 11 constructed by sequentially stacking a plurality of the unit fuel cells (adjacent to one another), that is, stacking the electricity generators (adjacent to one another). The stack 10 may be constructed with a stacked structure of polymer electrolyte membrane fuel cells (PEMFCs).

According to the present invention and referring back to FIG. 1, the reformer 30 generates the hydrogen from the fuel through a catalytic reaction such as a steam reforming reaction, a partial oxidation reaction, and/or an auto-thermal reaction.

The reformer 30 includes a heat source unit 35 which generates thermal energy and a reforming reaction unit 39 which generates the hydrogen through a reforming reaction of the fuel using the thermal energy. A more detailed construction of the reformer 30 will be described later with reference to FIGS. 3 and 4.

The fuel supply unit 50 for supplying the fuel to the reformer 30 includes a fuel tank 51 which stores the fuel and a fuel pump 53 for discharging the fuel from the fuel tank 51 to supply the fuel to the reformer 30. The fuel tank 51 is connected to the heat source unit 35 and the reforming reaction unit 39 through the fuel pump 53.

The air supply unit 70 includes an air pump 71 which pumps air using a pumping force (which may be predetermined) and supplies the air to the electricity generators 11 and the heat source unit 35. In the embodiment, as shown in FIG. 1, the air supply unit 70 uses a single air pump 71 to supply the air to the electricity generators 11 and the heat source unit 35. However, the present invention is not limited thereto, and the air supply unit 70 may use a pair of air pumps which are separately connected to the electricity generators 11 and the heat source unit 35.

Also, instead of using the air pump 71, the air supply unit 70 may instead use a general fan.

Now, the reformer 30 according to an embodiment of the present invention will be described in more detail with reference to FIGS. 3 and 4.

Figure 3:
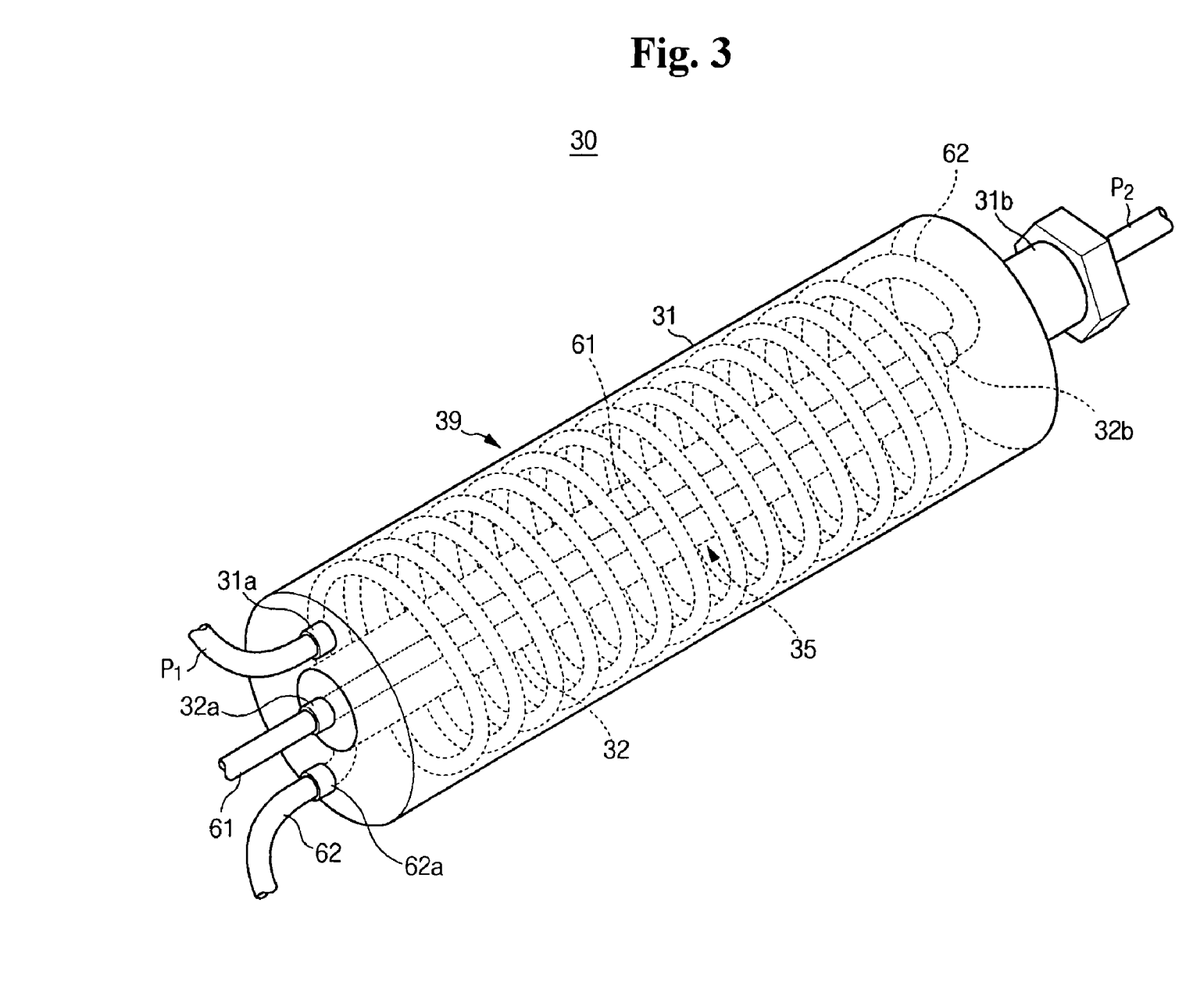
FIG. 3 is a schematic perspective view showing a reformer for a fuel cell system according to an embodiment of the present invention.

FIG. 3 is a schematic perspective view showing a reformer for a fuel cell system according to an embodiment of the present invention. FIG. 4 is a cross-sectional view of the reformer shown in FIG. 3.

Figure 4:
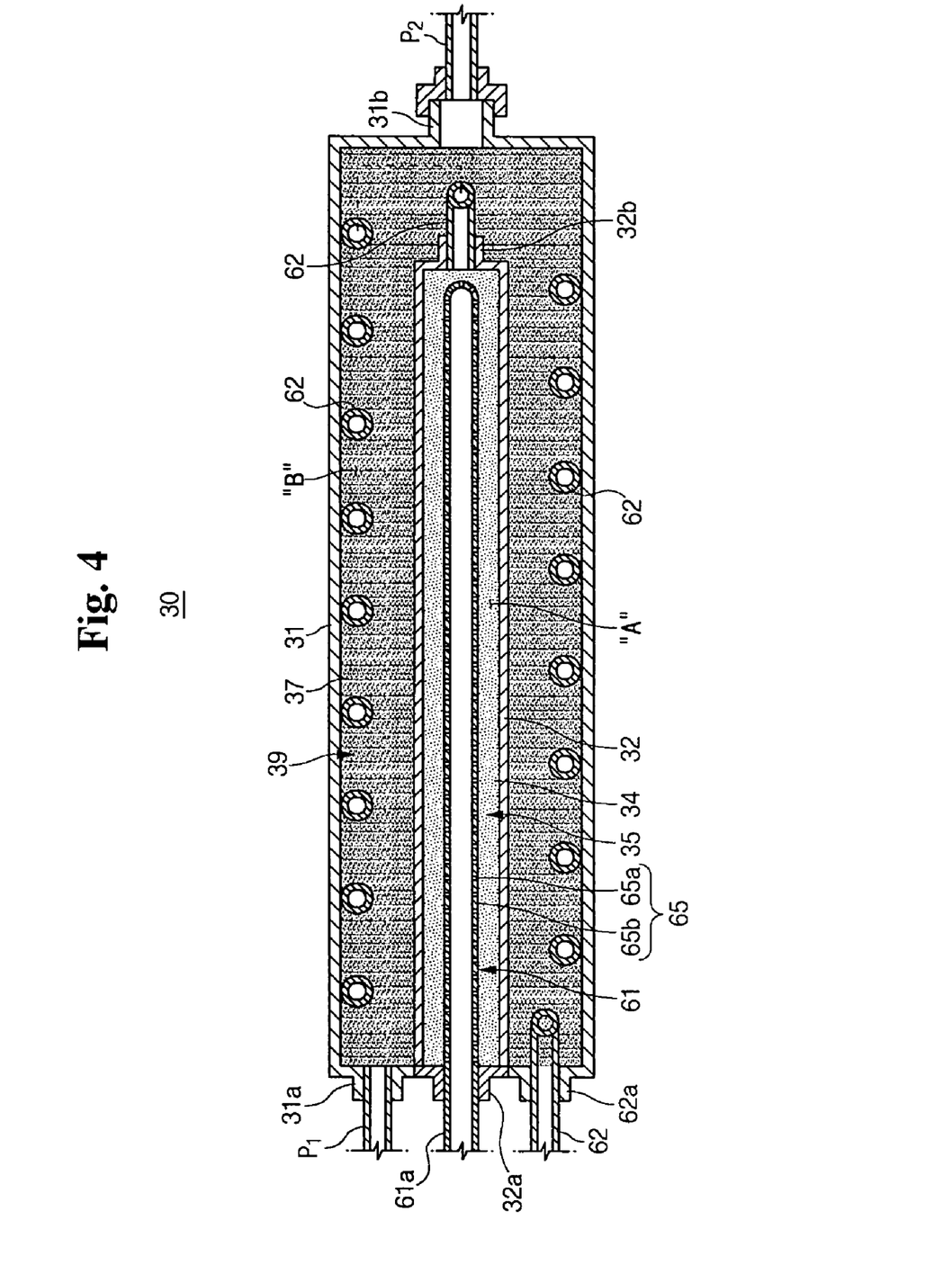
FIG. 4 is a cross-sectional view of the reformer shown in FIG. 3.

Referring to FIGS. 3 and 4, a reformer 30 according to an embodiment of the present invention includes a heat source unit 35 which generates thermal energy through an oxidation catalytic reaction of fuel and oxygen (or oxidant) and a reforming reaction unit 39 which generates hydrogen (or hydrogen-rich gas) from the fuel through a reforming catalytic reaction using the thermal energy.

The reformer 30 has two cylindrical pipes for forming first and second spaces A and B that are isolated from each other. That is, the reformer 30 includes a first body 31 corresponding to the reforming reaction unit 39 and a second body 32, which is disposed in an inner portion of the first body 31, corresponding to the heat source unit 35.

The first body 31 has a shape of a cylindrical pipe, having a first cross-sectional area (which may be predetermined), of which ends are substantially closed. The first body 31 may be made of a thermal insulating material such as a metal and/or non-metal having a thermal insulating property.

The second body 32 has a shape of a cylindrical pipe, having a second cross-sectional area smaller than that of the first cross-sectional area of the first body 31, of which ends are substantially closed. The second body 32 is disposed along the inner central portion of the first body 31, and an outer surface of the second body 32 is separated by a certain (or predetermined) interval from an inner surface of the first body 31.

Therefore, the reformer 30 of FIGS. 3 and 4 is provided with the first space A which is formed in the second body 32, and the second space B which is formed between the first and second bodies 31 and 32.

An oxidation catalyst 34 is provided (or charged) in the first space A (which is in the second body 32), and the reforming catalyst 37 is provided (or charged) in the second space B between the first and second bodies 31 and 32. Accordingly, the reformer 30 includes the heat source unit 35 which generates the thermal energy through an oxidation catalytic reaction of the fuel and the oxygen (or oxidant) with the oxidation catalyst 34, and the reforming reaction unit 39 which generates hydrogen from the fuel through the reforming catalytic reaction of the fuel with the reforming catalyst 37 using the thermal energy.

A first hole 32a is formed on one end of the second body 32, and a second hole 32b is formed on the other end thereof.

A nozzle member 61 is inserted through the first hole 32a into the first space A in the second body 32. A combustion gas which is generated through the oxidation reaction of the fuel and the air with the oxidation catalyst 34 is vented though the second hole 32b.

The oxidation catalyst 34 in the heat source unit 35 is used for the oxidation reaction of the fuel and the air in order to generate heat having a temperature ranging from 200° C. to 300° C. required for the reforming reaction of the reforming reaction unit 39. The oxidation catalyst 34 may have a structure where a catalyst material, such as platinum (Pt) and/or ruthenium (Ru), is contained in a pellet-shaped container made of alumina ($Al_2O_3$), silica ($SiO_2$), and/or titania ($TiO_2$).

A third hole 31a is formed on one end of the first body 31, and a fourth hole 31b is formed on the other end thereof. The fuel supplied from the fuel tank 51 is injected through the third hole 31a into the second space B between the first and second bodies 31 and 32. The hydrogen (or hydrogen-rich gas) which is generated through the reforming reaction of the fuel with the reforming catalyst 37 is vented through the fourth hole 31b.

The third hole 31a is connected to the fuel tank 51 through a pipeline P1, and the fourth hole 31b is connected to the electricity generators 11 of the stack 10 through a pipeline P2.

The reforming catalyst 37 in the reforming reaction unit 39 is used to absorb heat generated by the heat source unit 35 in order to facilitate the reforming reaction of the fuel. The reforming catalyst 37 may have a structure where a catalyst material, such as copper (Cu), nickel (Ni), and/or platinum (Pt), is contained in a pellet-shaped container made of alumina ($Al_2O_3$), silica ($SiO_2$), and/or titania ($TiO_2$).

The nozzle member 61 of the reformer 30 has a function of reducing (or minimizing or preventing) a hotspot phenomenon caused from a localized oxidation reaction of the fuel and the air in the heat source unit 35.

The hotspot phenomenon is referred to as a phenomenon in which the generation of the thermal energy is concentrated on some regions of the heat source unit 35. That is, if the air is non-uniformly distributed over the oxidation catalyst 34 but concentrated on some regions thereof, the oxidation reaction of the fuel and the air is localized, so that hot spots are generated.

In the embodiment, in order to reduce (or minimize or prevent) the hotspot phenomenon, the nozzle member 61 is used to spray the fuel and the air into the first space A of the first body 32, so that the fuel and the air can be uniformly distributed over the oxidation catalyst 34.

More specifically, the nozzle member 61 is disposed along the inner central portion of the second body 32. The nozzle member 61 has a shape of a pipe having an opened end and a closed end.

The nozzle member 61 is inserted into the first space A of the second body 32 through the first hole 32a so as to allow the closed end thereof to be disposed in the first space A. The opened end of the nozzle member 61 is connected to the fuel tank 51 and the air pump 71.

The nozzle member 61 is provided with a nozzle pattern 65 for facilitating distribution of the fuel and the air over the oxidation catalyst 34. The nozzle pattern 65 includes a plurality of nozzle holes 65a (and nozzle intervals 65b) which are formed over the entire region of a body 61a of the nozzle member 61.

The nozzle holes 65a may be formed to have the same size with a constant interval over the entire region of the nozzle member 61 which is disposed in the first space A of the second body 32.

In addition, the reformer 30 is provided with a path member 62. The path member 62 functions as a heat transfer unit for transferring the thermal energy generated by the heat source unit 35 uniformly over the reforming reaction unit 39.

The path member 62 is formed with a pipe for venting the combustion gas vented from the heat source unit 35; that is, the path member 62 provides a combustion gas venting path passing through the second space B between the first and second bodies 31 and 32.

One end of the path member 62 is connected to the second hole 32b of the second body 32. The path member 62 is disposed in the second space B, and the other end of the path member 62 is connected through a fifth hole 62a at one end of the first body 31 to the exterior of the reformer 30.

That is, the one end of the first body 31 is provided with the fifth hole 62a through which the other end of the path member 62 is connected to the exterior of the reformer 30. The path member 62 has a shape of a coil which is in contact with the inner surface of the first body 31.

Due to the path member 62, the thermal energy generated from the central portion of the heat source unit 35 can be uniformly transferred over the second space B between the first and second bodies 31 and 32 and over the reforming catalyst 37 located at the outermost surface of the heat source unit 35.

Now, operations of the reformer for a fuel cell system according to the embodiment of present invention will be described in more detail.

When the fuel cell system 100 starts, the fuel pump 53 is driven to supply the fuel stored in the fuel tank 51 to the nozzle member 61. The air pump 71 is driven to supply the air to the nozzle member 61.

Here, the fuel pump 53 and the air pump 71 may be simultaneously driven to simultaneously supply the fuel and the air to the nozzle member 61. Alternatively, fuel pump 53 and the air pump 71 may be sequentially driven to sequentially supply the fuel and the air to the nozzle member 61.

The fuel and the air are sprayed through the nozzle pattern 65 of the nozzle member 61 into the first space A of the second body 32. More specifically, the fuel and air sprayed though the nozzle holes 65a of the nozzle pattern 65 are uniformly distributed over the oxidation catalyst 34. The fuel and the air contact the oxidation catalyst 34, so that the oxidation reaction occurs.

In the heat source unit 35, through the oxidation reaction of the fuel and the air with the oxidation catalyst 34, the fuel is reacted (or burned) with the air so as to generate the thermal energy having a temperature, for example, ranging from 200° C. to 300° C. required for the reforming reaction of the reforming reaction unit 39.

At this time, due to the nozzle pattern 64 of the nozzle member 61, the fuel and the air can be uniformly distributed over the oxidation catalyst 34 in the second body 32, so that the oxidation reaction can uniformly occur over the entire region of the oxidation catalyst 34 in the heat source unit 35.

As a result, the hotspot phenomenon described above is reduced (or does not occur) over the entire region of the heat source unit 35. Accordingly, the temperature gradient in the entire region of the heat source unit 35 can be reduced, so that the thermal energy with a uniform temperature distribution can be provided to the reforming reaction unit 39.

Next, the combustion gas with a relatively high temperature, which is generated during the oxidation reaction of the fuel and the air in the inner portion of the second body 32, is vented from the second body 32 through the second hole 32$b$ thereof.

According to the embodiment, since the path member 62 having a shape of a coil is disposed to be in contact with the inner surface of the first body 31 and connected to the exterior of the reformer 30 through one end of the first body 31, the combustion gas flows along the path member 62 through the second space B between the first and second bodies 31 and 32 to be vented to the exterior of the reformer 30.

The path member 62 is heated at a temperature (which may be predetermined) by the thermal energy of the combustion gas to emit the thermal energy. Therefore, the path member 62 provides an additional thermal energy transfer path (or can transfer thermal energy) to the reforming catalyst 37 of the reforming reaction unit 39.

Particularly, since the path member 62 having a shape of a coil is disposed to be in contact with the inner surface of the first body 31, the thermal energy generated from the central portion of the heat source unit 35 can be uniformly transferred over the second space B between the first and second bodies 31 and 32 and over the reforming catalyst 37 which is located at the outermost surface of the heat source unit 35. As a result, the reforming reaction unit 39 can maintain a uniform temperature distribution over the entire region thereof.

In this state, the fuel pump 53 is driven to supply the fuel stored in the fuel tank 51 to the second space B between the first and second bodies 31 and 32 through the pipeline P1.

The reforming reaction unit 39 absorbs the thermal energy generated by the heat source unit 35 by using the aforementioned processes and generates the hydrogen (or hydrogen-rich gas) from the fuel through the reforming reaction of the fuel by using the thermal energy.

Next, the hydrogen (or hydrogen-rich gas) is supplied to the electricity generators 11 of the stack 10 through the pipeline P2. At the same time, the air pump 71 is driven to supply the air to the electricity generators 11.

The electricity generators 11 generate electric energy having a certain capacity (which may be predetermined) through an electro-chemical reaction of the hydrogen (or hydrogen-rich gas) from the reformer 30 and the oxygen contained in the air.

Figure 5:
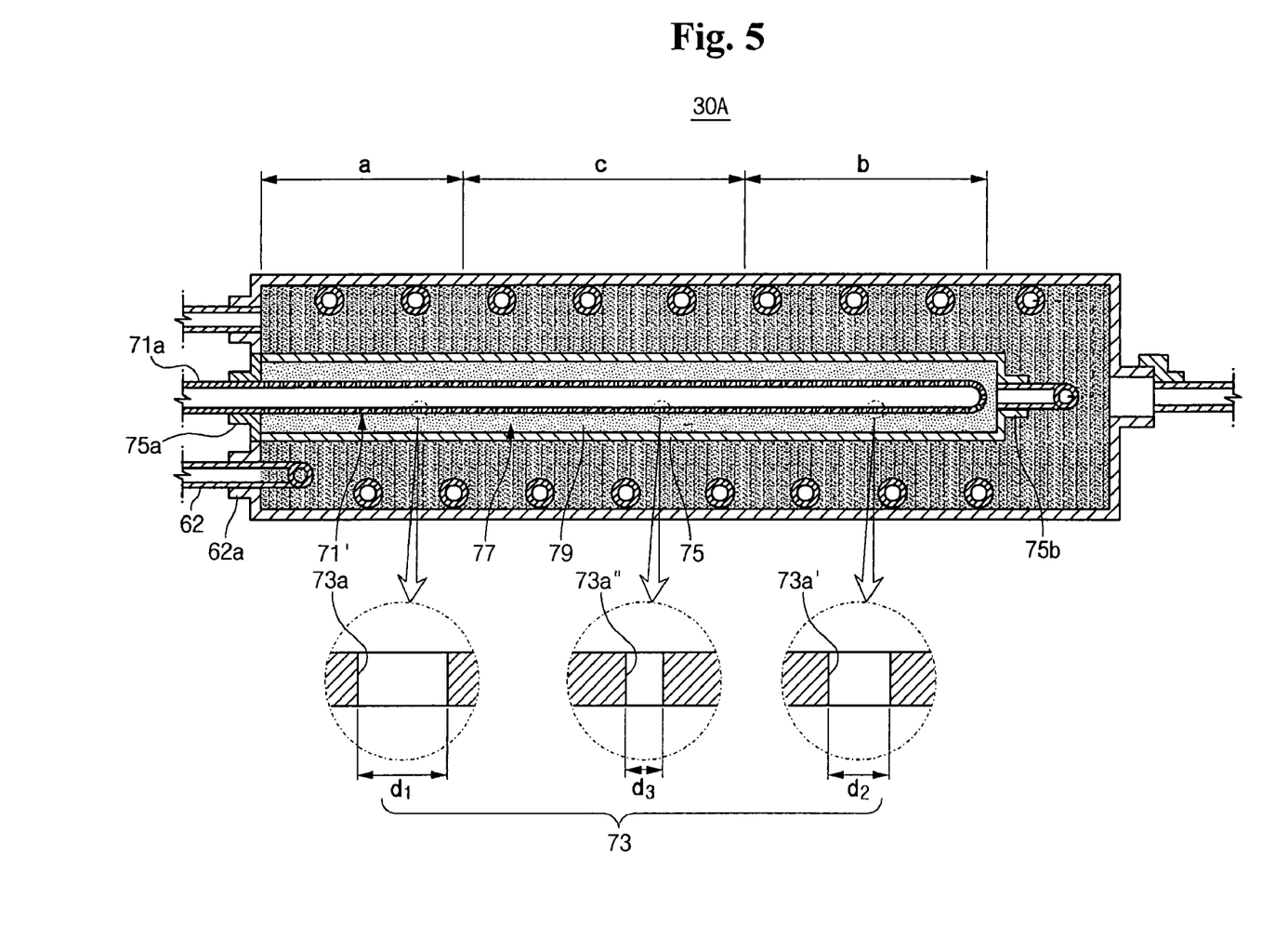
FIG. 5 is a cross-sectional view of a reformer according to another embodiment of the present invention.

FIG. 5 is a cross-sectional view of a reformer according to another embodiment of the present invention.

In FIG. 5, a reformer 30A is substantially the same as the reformer 30 according to the aforementioned embodiment. However, in the embodiment of FIG. 5, sizes of nozzle holes 73$a$, 73$a'$, and 73$a''$ of a nozzle pattern 73 are different according to regions of a body 71$a$ of a nozzle member 71'.

Referring to FIG. 5, in the nozzle member 71', a size of the nozzle holes 73$a$ in a region a near a first hole 75$a$ of a second body 75 is denoted by d1, a size of the nozzle holes 73$a'$ in a region b near a second hole 75$b$ of the second body 75 is denoted by d2, and a size of the nozzle holes 73$a''$ in a region c between the region a near the second hole 75$a$ and the region b near the second hole 75$b$ is denoted by d3. In the embodiment, the sizes of the nozzle holes 73$a$, 73$a'$, and 73$a''$ are designed to satisfy a relation of d1>d2>d3.

In FIG. 5, the region a is near the first hole 75$a$; the region b is near the second hole 75$b$; and the region c is between the region a near the second hole 75$a$, and the region b near the second hole 75$b$ is denoted by c.

A reason why the sizes of the nozzle holes 73$a$, 73$a'$, and 73$a''$ are formed to be different according the regions a, b, and c of the nozzle member 71' is as follows:

In the region a, since the fuel and the air are not preheated, the thermal energy having the lowest temperature is generated, so that the size of the nozzle holes 73$a$ is designed to be largest.

In the region b, since a concentration of the fuel and the air passing through the oxidation catalyst gradually decreases, the thermal energy having a relative temperature higher than that of region a (but lower than that of region c) is generated, so that the size of the nozzles holes 73$a'$ is designed to be smaller than the nozzle holes 73$a$ (but larger than the nozzle holes 73$a''$).

In the region c, since the fuel and the air are preheated to a maximum temperature and the concentration of the fuel and the air is relatively high, the thermal energy having a temperature higher than that of the region b is generated, so that the size of the nozzle holes 73$a''$ is designed to be smaller than the nozzle holes 73$a'$ (or to be smallest).

In this manner, due to the different sizes of the nozzle holes 73$a$, 73$a'$, and 73$a''$, amounts of the fuel and the air distributed over the regions of an oxidation catalyst 79 of the heat source unit 77 can be adjusted, so that the thermal energy can be transferred with a uniform temperature distribution over the entire regions of the heat source unit 77.

Figure 6:
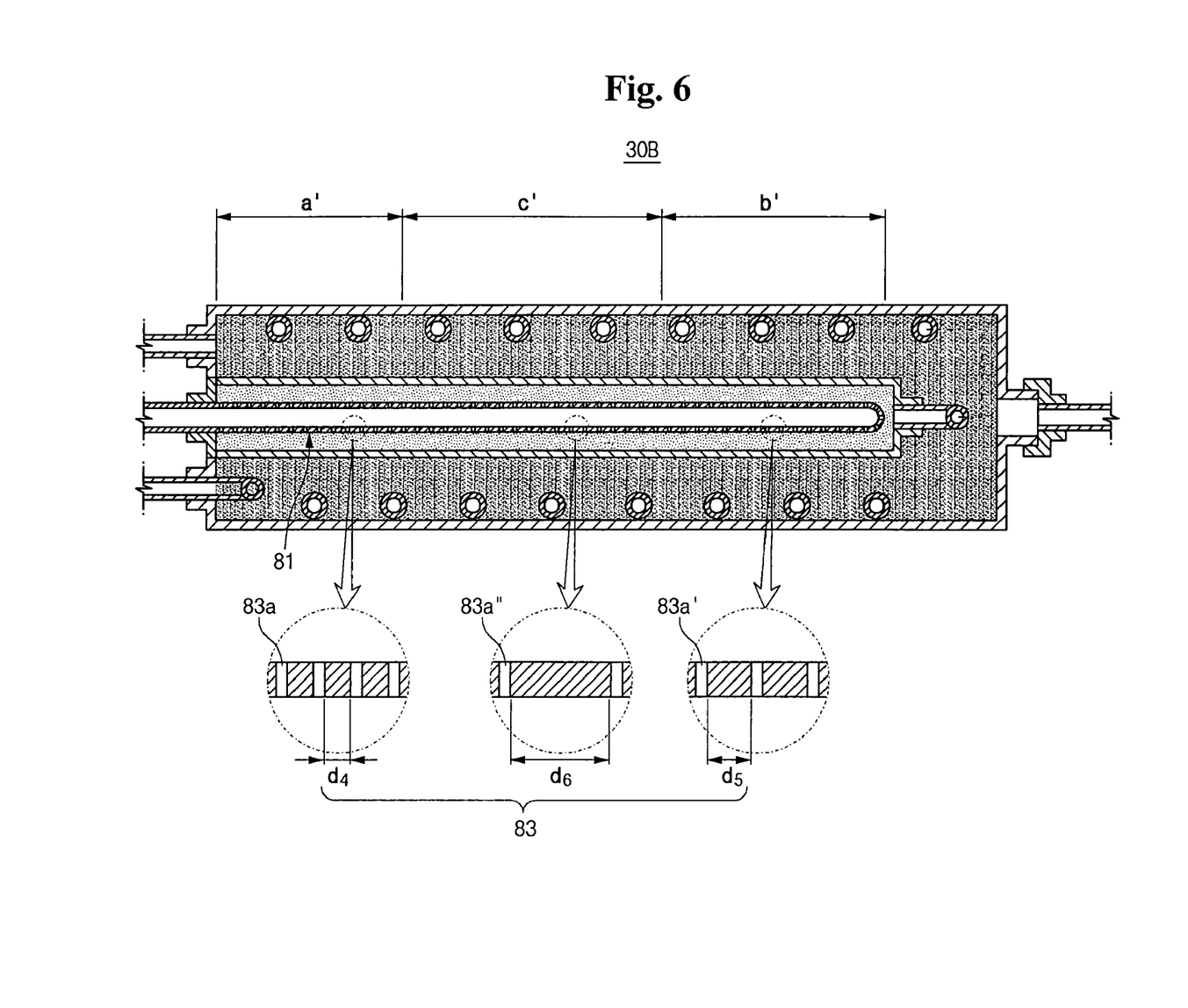
FIG. 6 is a cross-sectional view of a reformer according to still another embodiment of the present invention.

FIG. 6 is a cross-sectional view of a reformer according to still another embodiment of the present invention.

In FIG. 6, a reformer 30B is substantially the same as the reformer 30 and/or the reformer 30A according to the aforementioned embodiments. However, in the embodiment of FIG. 6, intervals between nozzle holes 83$a$, 83$a'$, and 83$a''$ are different according to regions of a body 81$a$ of a nozzle member 81.

That is, in the reformer 30B, regions a', b', and c' of FIG. 6 are substantially the same as the regions a, b, and c of FIG. 5. However, in FIG. 6, an interval between the nozzle holes 83$a$ in the region a' is denoted by d4; an interval between the nozzle holes 83$a'$ in the region b' is denoted by d5; and an interval between the nozzle holes 83$a''$ in the region c' is denoted by d6. In order to obtain a uniform temperature distribution (similar to the embodiment of FIG. 5), the intervals between nozzle holes 73$a$, between nozzle holes 73$a'$, and between nozzle holes 73$a''$ are designed to satisfy a relation of d6>d5>d4.

According to the embodiments of the present invention, a reformer includes a heat source unit and a reforming reaction unit. Thermal energy generated by the heat source unit can be efficiently transferred to the reforming reaction unit, so that a uniform temperature distribution can be maintained over the entire regions of the reforming reaction unit. Accordingly, performance and thermal efficiency of the reformer can be improved.

In addition, according to the embodiment of the present invention, a nozzle member can distribute fuel and air over an oxidation catalyst of the heat source unit, so that a hot spot phenomenon caused from a localized oxidation reaction can be reduced (or minimized or prevented). Therefore, the thermal energy can be provided with a uniform temperature distribution over the entire region of the reforming reaction unit. Accordingly, the performance and thermal efficiency of the reformer can be further improved.

In addition, according to the embodiment of the present invention, the reformer is formed with a simple structure having two cylindrical pipes for forming first and second spaces, so that a compact fuel cell system can be implemented.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A reformer for a fuel cell system, the reformer comprising:
    a first body;
    a second body in an inner portion of the first body and having a first end and a second end opposite the first end, wherein an inner portion of the second body comprises a heat source unit for generating heat;
    a reforming reaction unit including a reforming catalyst provided in a space between the first body and the second body for generating a hydrogen-rich gas from a fuel through a reforming reaction using the reforming catalyst; and
    a nozzle member within the heat source unit, the nozzle member comprising a substantially pipe-shaped body extending from the first end and having a portion closer to the second end than the first end, the nozzle member having a plurality of nozzle holes each extending transversely through the substantially pipe-shaped body,
    wherein the nozzle member is partitioned to have a plurality of regions adjacent to one another along a longitudinal axis of the nozzle member, and wherein the nozzle holes are arranged in a nozzle pattern that is substantially similar within each of the regions and that is different between at least two of the regions for distributing the fuel and an oxidant substantially uniformly throughout the heat source unit.

2. The reformer of claim 1, further comprising a path member connected to the second body and in the inner portion of the first body for venting a combustion gas generated by the second body from the first body.

3. The reformer of claim 2, wherein the path member has a shape of a coil.

4. The reformer of claim 2,
    wherein both the first end and the second end are substantially closed, and
    wherein the first end is provided with a first hole through which the nozzle member is inserted into the inner portion of the second body, and
    wherein the second end is provided with a second hole through which the combustion gas is vented.

5. The reformer of claim 4, wherein the path member is connected to the second hole.

6. The reformer of claim 4,
    wherein the first body has a third end and a fourth end, both the third end and the fourth end being substantially closed, and
    wherein the third end is provided with a third hole through which the fuel is injected, and
    wherein the fourth end is provided with a fourth hole through which the hydrogen-rich gas is vented.

7. The reformer of claim 6, wherein the third end of the first body is provided with a fifth hole through which the path member is extracted.

8. The reformer of claim 1, wherein the substantially pipe-shaped body of the nozzle member has an opened end and a closed end, and wherein the nozzle pattern is configured to distribute the fuel and the oxidant in the inner portion of the second body.

9. The reformer of claim 8, wherein the closed end of the nozzle member is in the inner portion of the second body.

10. The reformer of claim 1, wherein the plurality of nozzle holes have different sizes according to the regions.

11. The reformer of claim 1, wherein the plurality of nozzle holes are separated by different intervals according to the regions.

12. The reformer of claim 1,
    wherein the first body has a third end and a fourth end, both the third end and the fourth end being substantially closed, and
    wherein the third end is provided with a first hole through which the fuel is injected, and
    wherein the fourth end is provided with a second hole through which the hydrogen-rich gas is vented.

13. The reformer of claim 12, further comprising a path member connected to the second body and in the inner portion of the first body for venting a combustion gas generated by the second body from the first body, wherein the third end of the first body is provided with a third hole through which the path member is extracted.

14. The reformer of claim 1, wherein the reforming catalyst has a pellet shape.

15. The reformer of claim 1, wherein the heat source unit includes an oxidation catalyst in the inner portion of the second body.

16. The reformer of claim 15, wherein the oxidation catalyst has a pellet shape.

17. The reformer of claim 1, wherein the first body and the second body are cylindrical.

18. A reformer for a fuel cell system, the reformer comprising:
    a thermal insulating outer body;
    a heat source unit in an inner portion of the thermal insulating outer body and having a first end and a second end opposite the first end, the heat source unit for generating heat;
    a reforming reaction unit provided in a space between the heat source unit and the thermal insulating outer body for generating a hydrogen-rich gas from a fuel through a reforming reaction, the reforming reaction unit surrounding the heat source unit; and
    a nozzle member within the heat source unit, the nozzle member comprising a substantially pipe-shaped body extending from the first end and having a portion closer to the second end than the first end, the nozzle member having a plurality of nozzle holes each extending transversely through the pipe-shaped body,
    wherein the nozzle member is partitioned to have a plurality of regions adjacent to one another along a longitudinal axis of the nozzle member, and wherein the nozzle holes are arranged in a nozzle pattern that is substantially similar within each of the regions and that is different between at least two of the regions for distributing the fuel and an oxidant substantially uniformly throughout the heat source unit.

19. The reformer of claim 18, further comprising a path member connected to the heat source unit and in an inner portion of the reforming reaction unit for venting a combustion gas generated by the heat source unit from the reforming reaction unit and for uniformly distributing the heat generated from the heat source unit to the reforming reaction unit.

20. The reformer of claim 19, wherein the path member has a shape of a coil.

* * * * *